United States Patent
Park et al.

(10) Patent No.: US 12,355,029 B2
(45) Date of Patent: Jul. 8, 2025

(54) PRESSURE REGULATION SYSTEM FOR SILICON DOMINANT ANODE LITHIUM-ION CELL

(71) Applicant: Enevate Corporation, Irvine, CA (US)

(72) Inventors: Benjamin Yong Park, Mission Viejo, CA (US); Sung Won Choi, San Diego, CA (US); Rahul R. Kamath, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 16/723,967

(22) Filed: Dec. 20, 2019

(65) Prior Publication Data

US 2021/0194041 A1 Jun. 24, 2021

(51) Int. Cl.
*H01M 10/0525* (2010.01)
*H01M 4/134* (2010.01)
*H01M 50/20* (2021.01)
*H01M 50/333* (2021.01)

(52) U.S. Cl.
CPC ....... *H01M 10/0525* (2013.01); *H01M 4/134* (2013.01); *H01M 50/20* (2021.01); *H01M 50/333* (2021.01); *H01M 2220/20* (2013.01)

(58) Field of Classification Search
CPC .......... H01M 10/0525; H01M 50/333; H01M 4/134; H01M 50/20; H01M 2220/20; H01M 50/211; H01M 50/474; H01M 10/6555; H01M 50/209; H01M 50/293; H01M 50/48
See application file for complete search history.

(56) References Cited

U.S. PATENT DOCUMENTS

| | | | | |
|---|---|---|---|---|
| 9,705,156 | B2* | 7/2017 | Dorsch | H01M 50/213 |
| 2010/0304203 | A1* | 12/2010 | Buck | H01M 10/647 |
| | | | | 29/730 |
| 2014/0266066 | A1* | 9/2014 | Turon Teixidor | H01M 10/446 |
| | | | | 429/66 |
| 2015/0017504 | A1* | 1/2015 | Isshiki | B60L 53/65 |
| | | | | 429/120 |
| 2017/0317324 | A1* | 11/2017 | Westermeier | H01M 50/28 |

FOREIGN PATENT DOCUMENTS

| | | | | |
|---|---|---|---|---|
| DE | 102015011895 | | 4/2016 | |
| DE | 102015011895 A1 * | | 4/2016 | H01M 10/658 |

OTHER PUBLICATIONS

Notification of Transmittal of The International Search Report And the Written Opinion of the International Searching Authority, or the Declaration, mailed Mar. 12, 2021, For International Application PCT/US20/63451, International Filing Date Dec. 4, 2020, for Applicant Enevate Corporation.

* cited by examiner

Primary Examiner — Ula C Ruddock
Assistant Examiner — Sarika Gupta
(74) Attorney, Agent, or Firm — McAndrews, Held & Malloy, Ltd.

(57) ABSTRACT

The disclosure herein pertains to a pressure regulation system for use in a silicon dominate anode lithium-ion cell. The pressure regulation system regulates a lifetime pressure on the lithium-ion cell in order to correct for capacity loss and mechanical failure due the expansion of silicon during operation. The pressure regulation system along with a housing maintains a certain pressure range on the lithium-ion cells during the cycling and the operational life of the energy storage device.

23 Claims, 9 Drawing Sheets

PRESSURE REGULATION SYSTEM FOR SILICON DOMINANT ANODE LITHIUM-ION CELL

BACKGROUND

Field

The present application relates generally to a pressure regulation system for use with lithium ion cells. In particular, the present application relates to use of spring layer(s) in combination with a housing to control pressure exerted on lithium ion cells with silicon-dominant anodes.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be cut into pieces which are then layered into stacks. The stacks are of alternating electro-chemically active materials with the separator between them.

Silicon has been used as the active material for the negative electrode to increase the volumetric and gravimetric energy densities of lithium ion batteries. However, during cycling, silicon particles in the anode active material expand upon charging. This expansion can deform the metal foil used as current collectors or damage the separator between the two electrodes if the cell is confined in a specific volume with little or no expansion capability. In this case, since the layers of the cell stack are confined in a tight region, the expansion can result in warping or deformation of the metal foil, thus reducing the contact area between layers in the cell stack. The expansion can compress the separator, thereby shorting the cell, or negatively affecting the ability for ions to move freely between the electrodes when the pores in the separator become compressed. As a result, the ability of a battery to accept and release electrical charge may be severely affected. Thus, preventing the electrodes and separators from deformation could serve to reduce the irreversible capacity loss and improve cycle life.

SUMMARY

A energy storage device comprising a cell stack comprising a plurality of lithium-ion cells is provided. Each lithium-ion cell comprises a Si-dominant anode. A energy storage device further comprises a housing surrounding the cell stack, a pressure regulation system comprising a spring layer between two of the plurality of lithium-ion cells, and wherein the pressure regulation system in combination with the housing exerts an initial pressure of between about 25 kPa and about 170 kPa on the cell stack.

In some embodiments, the spring layer comprises silicone foam, low-density polyethylene (LDPE) foam, high-density polyethylene (HDPE) foam, crosslinked polyethylene (PE) foam, polypropylene (PP) foam, natural rubber foam, polyester foam, polyurethane foam, or latex foam.

A lithium ion battery pack is also disclosed. The lithium ion battery pack comprises two or more energy storage devices described above and an outer packing material surrounding the one or more energy storage devices.

A vehicle comprising the lithium ion battery pack as described above, and electrical components electrically connected to the lithium ion battery pack,

BRIEF DESCRIPTION OF THE DRAWINGS

FIGS. 6A and 6B shows the cycle performance of Si-dominant anode Li-ion batteries with the same type of spring layer but two different thicknesses. FIG. 6A was plotted showing discharge capacity (Ah) while FIG. 6B was plotted showing the % discharge capacity.

FIGS. 7A and 7B shows the cycle performance of Si-dominant anode Li-ion batteries with one embodiment of spring layer charged at 1 C and 4 C rate. FIG. 7A was plotted showing discharge capacity (Ah) while FIG. 7B was plotted showing the % discharge capacity.

FIGS. 8A and 8B shows the cycle performance of Si-dominant anode Li-ion batteries with another embodiment of spring layer charged at 1 C and 4 C rate. FIG. 8A was plotted showing discharge capacity (Ah) while FIG. 8B was plotted showing the % discharge capacity.

FIGS. 9A and 9B shows the cycle performance of Si-dominant anode Li-ion batteries with yet another embodiment of spring layer charged at 1 C and 4 C rate. FIG. 9A was plotted showing discharge capacity (Ah) while FIG. 9B was plotted showing the % discharge capacity.

FIG. 10B is the normalized plot of FIG. 10A.

DETAILED DESCRIPTION

Described herein, are embodiments of a pressure regulation system for use with lithium ion cells. A promising class of lithium ion cells include silicon electrodes (e.g., anodes and/or cathodes) that include silicon or a composite material containing silicon for battery applications (e.g., lithium ion battery applications). In most cases today, silicon is added to graphite in small quantities (<50%) to be used as a mixed active material in combination with the graphite. In silicon-dominant systems where the active material comprises about 50% or more of silicon, controlling the expansion of the electrodes and the pressure on the cells is much more important. Silicon is recognized as a potentially high energy per unit volume host material for lithium ion lithium battery applications. Batteries with silicon anodes can exhibit more rapid capacity loss upon cycling compared with batteries with graphite anodes. The repeated expansion and contraction of silicon particles during charge and discharge can lead to mechanical failure of the anode during the life of the battery. Exerting pressure on a lithium ion cell to control the amount of expansion can help mitigate the capacity loss and mechanical failure from repeated expansion and contraction based on cycling.

Embodiments of the disclosure relate to an energy storage device that includes a cell stack. The cell stack comprises a plurality of lithium ion cells. The cell stack includes, but is not limited to, a first lithium ion cell and a second lithium ion cell. The cell stack may further include a third lithium ion cell. The cell stack is surrounded by and contained within a housing. The energy storage device further includes a pressure regulation system that, in combination with the housing, is designed to allow the cells to expand and contract during normal cycling while keeping the pressure exerted on the cell within an acceptable range. The pressure regulation system includes a spring member (e.g., spring layer) positioned between two adjacent cells. Thus an energy storage device that has a plurality of cells may contain one or more spring members, each positioned in between adjacent cells. The spring member may also be positioned between the housing wall and the cell that is adjacent to the housing wall. The lithium ion cell may be a rectangular prism or have a cubical shape. Preferably, the lithium ion cell is a pouch cell.

Figure 1:
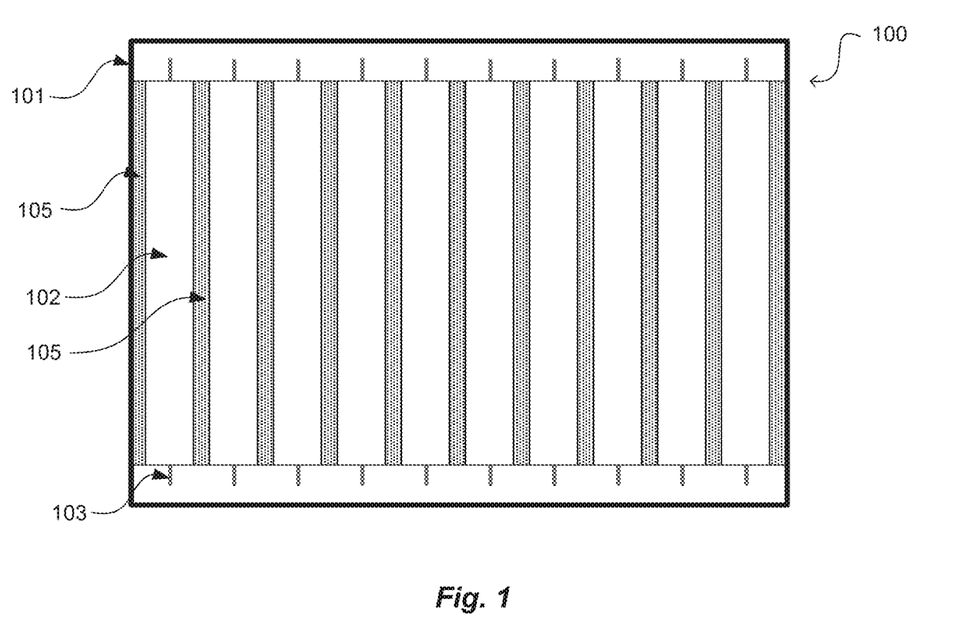
FIG. 1 illustrates a battery module including a pressure regulation device with optional heatsink layers according to one illustrative implementation.

FIG. 1 illustrates an example of an energy storage device 100. The energy storage device 100 includes a cell stack that comprises a plurality of lithium ion cells 102 enclosed in a housing 101. The energy storage device 100 further includes a pressure regulation system including one or more spring layer 105 disposed between adjacent lithium ion cells 102. There may be one spring member positioned between each of the adjacent cells. The lithium ion cell includes a silicon (Si) anode or Si-dominant anode on a current collector 103. The energy storage device can be a module or a collection of lithium ion cells.

Alternatively, some of the lithium ion cells 102 can be in direct contact with each other, and therefore, a spring layer 105 can be absent from between one or more cells 102. Further, there could be two or more spring layers 105 between two adjacent cells 102. The surface of the spring member that contacts the cell preferably has a substantially similar area as the cell surface that is in contact with the spring member. More preferably, the contacting surfaces of the spring member and the cell have substantially the same size.

Figure 2:
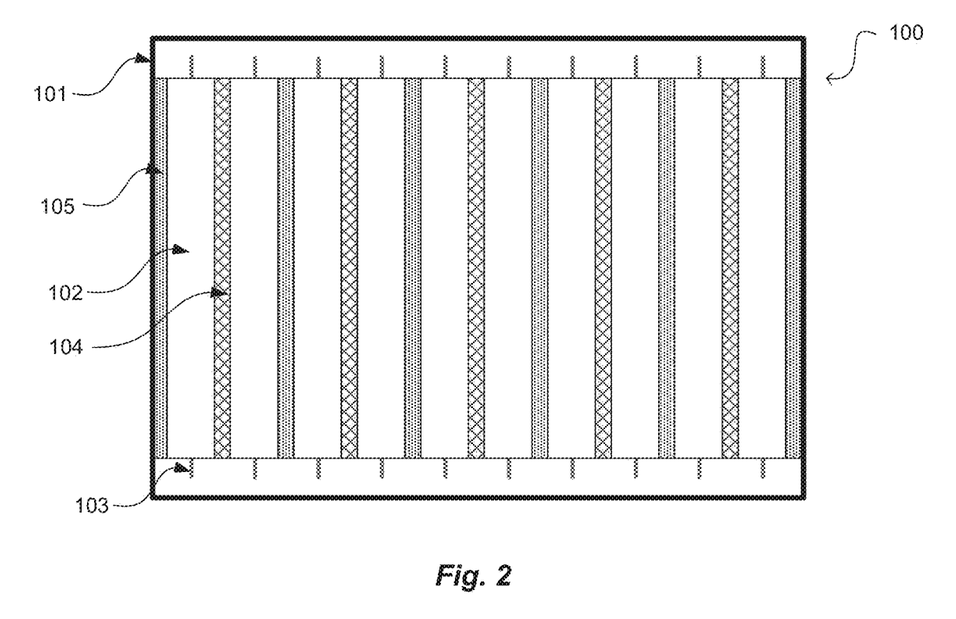
FIG. 2 illustrates a battery module including a pressure regulation device according to one illustrative implementation.

Optionally, the energy storage device may also include one or more heat-sink layer or heat-absorbing layer between some of the adjacent cells. The energy storage device may have a spring layer 105 positioned in between each of the several adjacent cells, and also have a heat-sink layer 104 positioned in between each of the other adjacent cells. Either a spring member 105 or a heat-sink layer 104 may be positioned between the housing wall and the adjacent cell. FIG. 2 illustrates one example of an energy storage device 100 wherein the heat-sink layers 104 are position in between every other adjacent cells 102, and the spring layers 105 are position in between every other adjacent cells 102 where there is no heat-sink layer 104. The surface of the heat-sink layer 104 that contacts the cell 102 preferably has a substantially similar area as the cell surface that is in contact with the heat-sink layer. More preferably, the contacting surfaces of the heat-sink layer and the cell have substantially the same size.

The spring member or layer 105 can be of differing material, density, shape, size, and/or thickness. The amount, specification, placement of spring layers 105 can be optimized based on the types of cell system. The spring layer may be a polymeric material or an elastic material. For example, the spring layer may contain silicone, polyolefin (such as polyethylene and polypropylene), cross-linked polyolefin, polyester, polyurethane, EPDM (ethylene propylene diene monomer) rubber, natural rubber, or synthetic rubber. The spring layer should exhibit good recovery or spring back behavior. In some embodiments, the spring layer is compressed less than about 15%, about 12%, about 10%, about 9%, or about 8% of its original thickness after.

In some embodiments, the spring layer may also be a foam. The foam may be an open pore or closed pore type foam. The foam preferably has a density from about 0.05 g/cc to about 1 g/cc, about 0.1 g/cc to about 1 g/cc, about 0.1 g/cc to about 0.9 g/cc, about 0.1 g/cc to about 0.8 g/cc, about 0.1 g/cc to about 0.7 g/cc, about 0.1 g/cc to about 0.65 g/cc, about 0.1 g/cc to about 0.55 g/cc. For example, the foam may comprise silicone foam, low-density polyethylene (LDPE) foam, high-density polyethylene (HDPE) foam, crosslinked polyethylene (PE) foam, polypropylene (PP) foam, natural rubber foam, polyester foam, polyurethane foam, neoprene, PVC/NBR (polyvinyl chloride/nitrile butyl rubber), styrene-butadiene rubber (SBR), EPDM rubber foam, or latex foam. The foam spring layer may have a thickness of from about 0.5 to about 3.5 mm, about 0.6 to about 3.4 mm, about 0.7 to about 3.2 mm, or about 0.8 to about 3.1 mm.

In some embodiments, the foam spring layer may comprise silicone. In some embodiments, the foam spring layer may comprise polyurethane (PU). A high-temp PU such as PORON® is preferred. In other embodiments, the spring layer may comprise EPDM rubber foam. The EPDM rubber foam could have a density of about 0.1 to about 1 g/cc and a thickness of between about 1.5 mm to about 3.2 mm.

In some embodiments, the spring layer may be a non-porous pad. The non-porous pad may have a density in the range of about 1 to about 3 g/cc, about 1 to about 2.8 g/cc, about 1.1 to about 2.5 g/cc, or about 1.1 to about 2.3 g/cc. For example, the spring layer may include a solid EPDM rubber piece.

The pressure regulation system in combination with the housing is designed to keep the pressure exerted on the cell stack during cycling within an acceptable range. Advantageously, maintaining pressure between an initial pressure and a maximum lifetime pressure on the cell stack mitigates against the capacity loss and mechanical failure from repeated expansion and contraction of electrodes due to cycling of the cell stack. The pressure regulation system in combination with the housing exerts an initial pressure of between about 25 kPa and about 170 kPa on the cell stack. In some embodiments, the initial pressure exerted on the cell stack should be between about 30 kPa and about 165 kPa, or between about 35 kPa and about 160 kPa. The pressure regulation system in combination with the housing further exerts a pressure of no more than about 300 kPa on the cell stack during the operational life of the energy storage device. Optionally, the pressure regulation system in combination with the housing further exerts a pressure of no more than about 280 kPa, no more than about 250 kPa, no more than about 200 kPa, or no more than about 180 kPa on the cell stack during the operational life of the energy storage device. In some embodiments, the pressure regulation system in combination with the housing exerts a pressure of no less than about 30 kPa on the cell stack during the operational life of the energy storage device. Alternatively, the pressure regulation system in combination with the housing exerts a pressure of no less than about 35 kPa, no more than about 40 kPa, or no more than about 45 kPa, Depending on the electrodes and the separator of the cell, the initial pressure and the maximum pressure may vary. When the initial pressure exerted on the cell stack is on the lower end, the maximum pressure exerted should also be on the lower end.

Preferably, the pressure regulation system in combination with the housing would keep the expansion of the cell stack under about 15% from 0% state of charge (SOC) to 100% SOC. More preferably, the expansion of the cell stack may be kept under about 10%, about 8%, about 6%, about 4%, about 3%, or about 2%. The expansion of the cell stack may be between about 2% and about 15%, between about 3% and about 15%, between about 3% and about 12%, between about 3% and about 10%, or between about 3% and about 8%.

The lifetime expansion of the cell at 100% SOC may be kept under about 20%, under about 18%, under about 15%, under about 12%, or under about 10% by the pressure regulation system in combination with the housing. In some implementations, the lifetime expansion of the cell at 100% SOC may be between about 5% and about 20%, between about 5% and about 18%, between about 5% and about 15%, between about 5% and about 12%, or between about 5% and about 10%.

Figure 3:
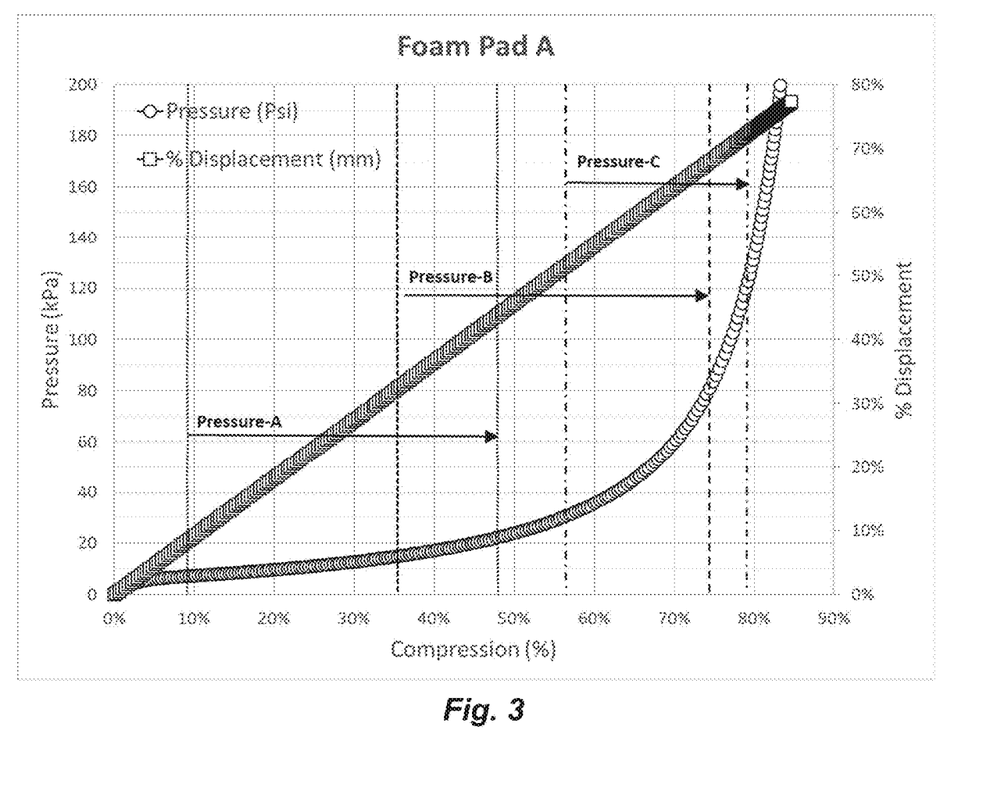
FIG. 3 describes the change in pressure exerted on the cell stack as a function of spring layer displacement as the cell stack expands during cycling.

FIG. 3 shows the relationship between the pressures exerted on the cell stack by the pressure regulation system in combination with the housing and the % displacement of the spring member for EPDM foam as the spring layer. The property of the foam determines the pressure to displacement response. While the % displacement is linear in relation to the % compression, the pressure response is not linear and increases rapidly after a certain amount of compression. As the cells expand during the lifetime of the pack, that expansion would be compressing the foam. The % displacement of the spring layer is assumed to be the same as the expansion of the cell, and the pressure is determined by how much pre-compression the foam is place into initially. In the examples shown in FIG. 3 some compression scenarios are shown. At the higher pressure (C), the compression is lessened due to the much higher pressure exerted on the cell. Depending on the cell performance and module-level constraints, the pressure range can be selected.

The energy storage device may be a lithium ion battery module. Two or more lithium ion battery energy storage devices surrounded by a packaging material form a battery pack. The battery pack can be incorporated into a vehicle and can power the vehicle and/or electrical components of a vehicle.

EXAMPLES

Cycle performances of the lithium ion batteries with various pressure regulating system parameters were obtained by measuring the discharge capacity of the battery from the beginning to the end of cycle life (500 cycles). The lithium ion cell used in the tests are as follows:
Anode: 3.8 mg/sq·cm of Silicon-Carbon Composite anode (85% Si, 15% C) laminated on adhesive coated Cu foil;
Cathode: 92% NCA, 4% carbon, 4% PVDF binder on Al foil, 23 mg/sq·cm;
Electrolyte: FEC/EMC (3:7 by weight) with 1.2M $LiPF_6$; and
Separator: PMMA coated Polyethylene separator.

Example 1

Cycle performance of the lithium ion battery due to the pressure effect was investigated. The cells with spring layers in between adjacent cells were clamped in between two metal plates held together with screws. A closed-cell silicone foam (Saint-Gobain® Norseal® F-20) with a thickness of 1.6 mm was used as the spring layer. A certain initial pressure on the cells at the beginning of cycle life was set for each battery module (at about 30-50% SOC), and the cells were charged at 1 C to 4.2V, and then discharged at 0.5 C for each cycle. The results show the capacity degradation (cycle life) of the cells at various initial pressure.

Figure 4:
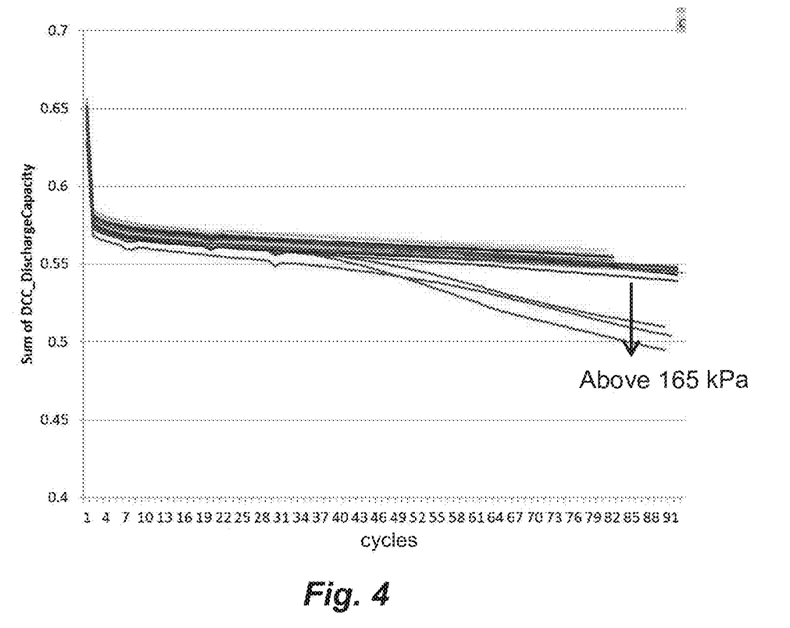
FIG. 4 is a plot showing the capacity degradation (cycle life) of Si-dominant anode Li-ion batteries cycling in room temperature while the cell stack is maintained under different pressures.
Figure 5:
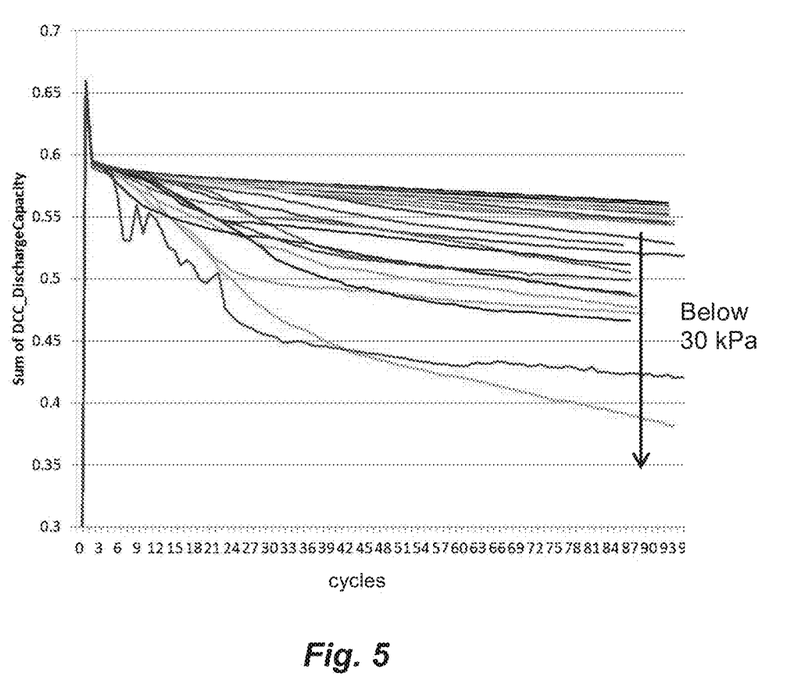
FIG. 5 is a plot showing the capacity degradation (cycle life) of Si-dominant anode Li-ion batteries cycling at 45° C. while the cell stack is maintained under different pressures.
Figure 6A:
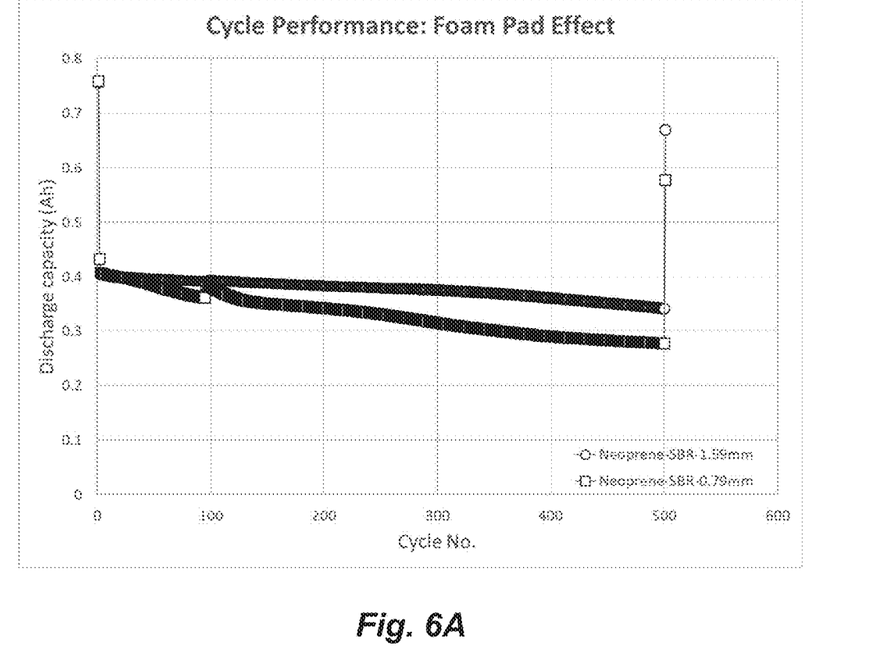
Figure 6B:
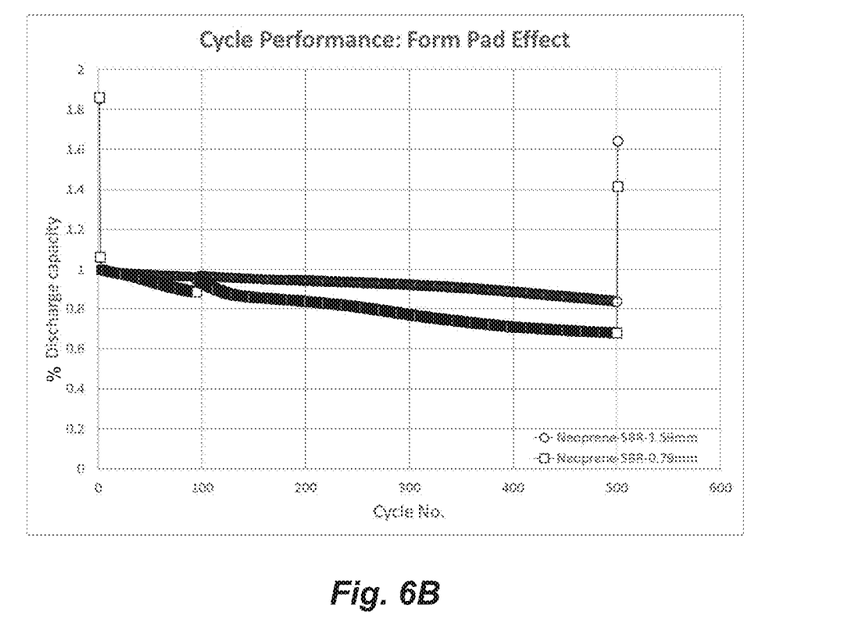
Figure 7A:
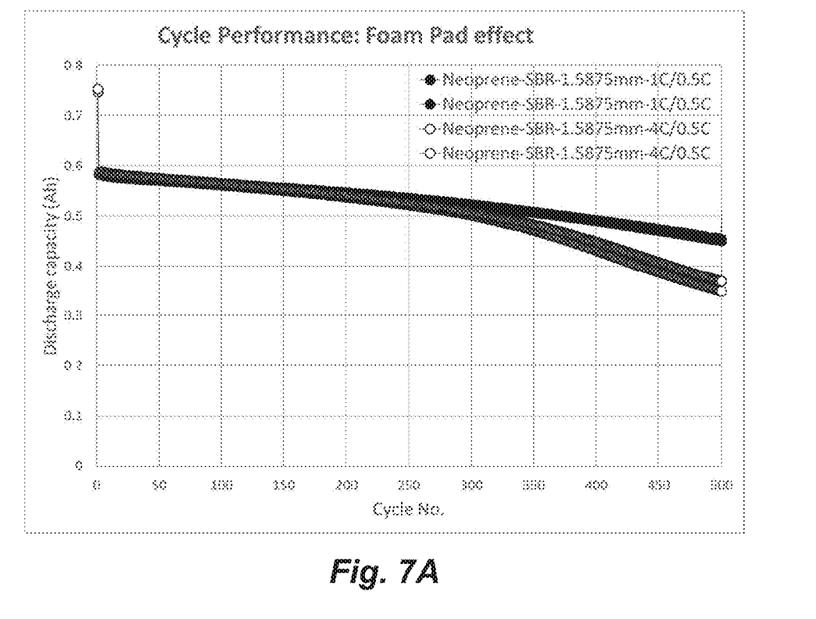
Figure 7B:
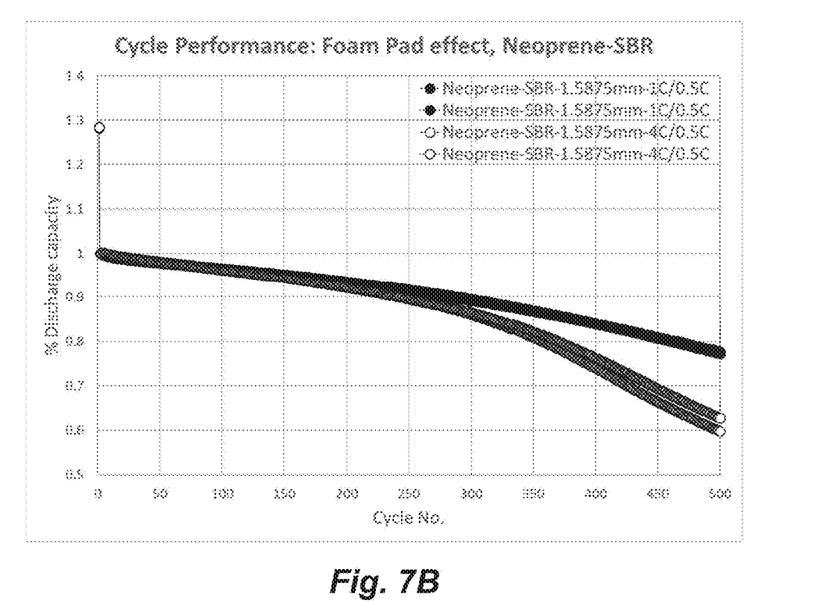
Figure 8A:
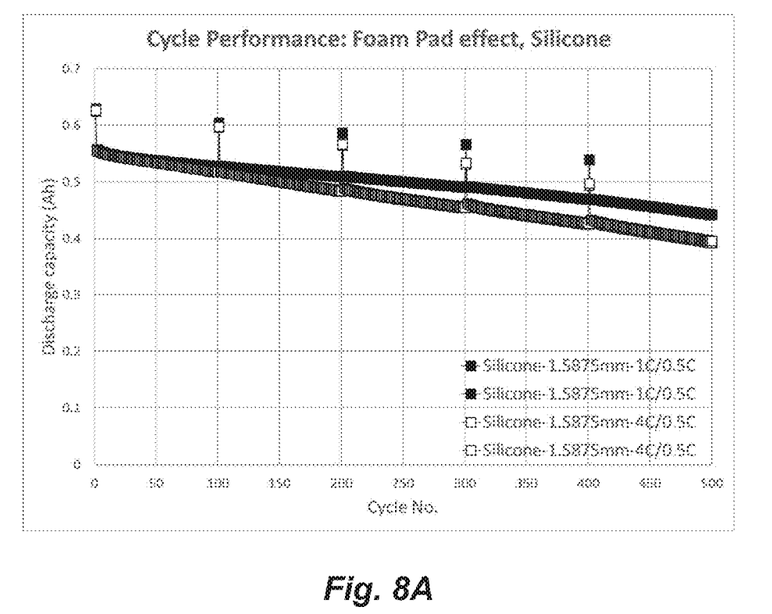
Figure 8B:
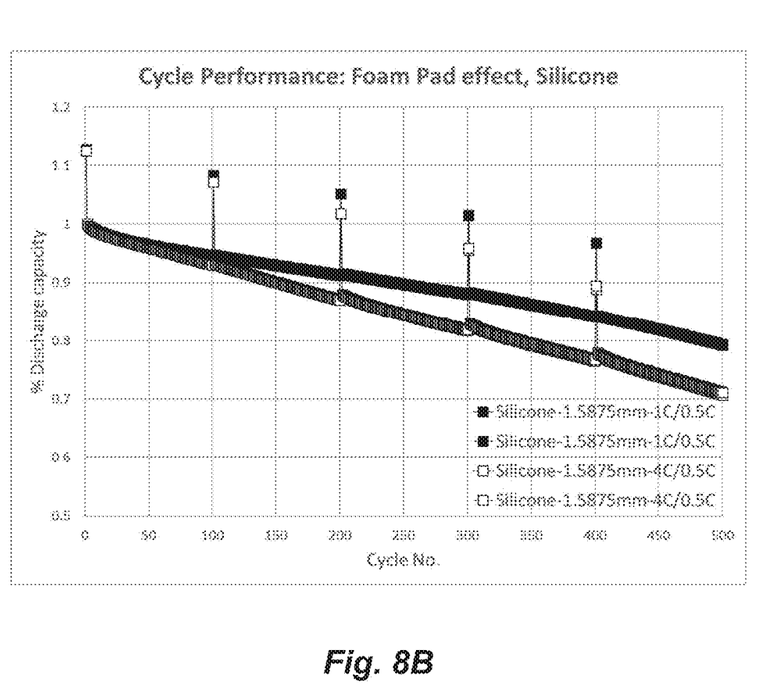
Figure 9A:
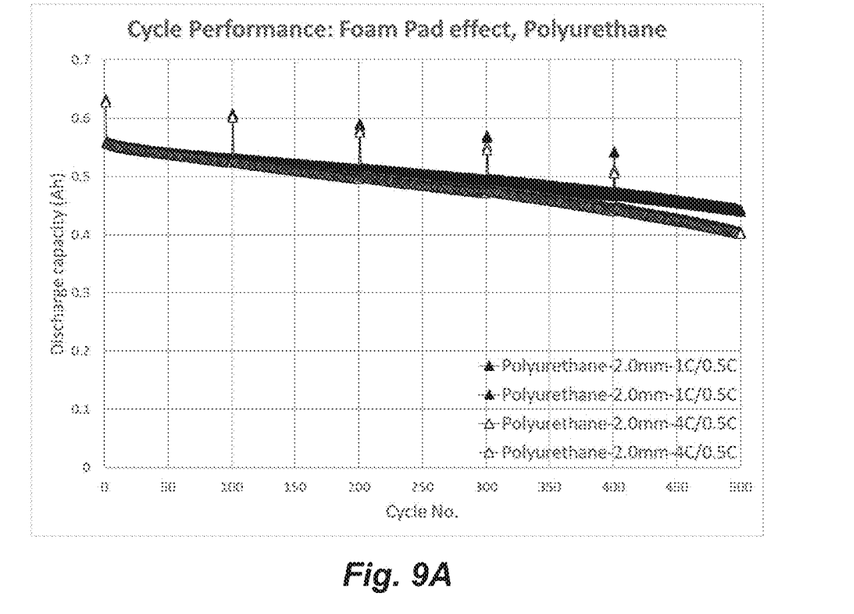
Figure 9B:
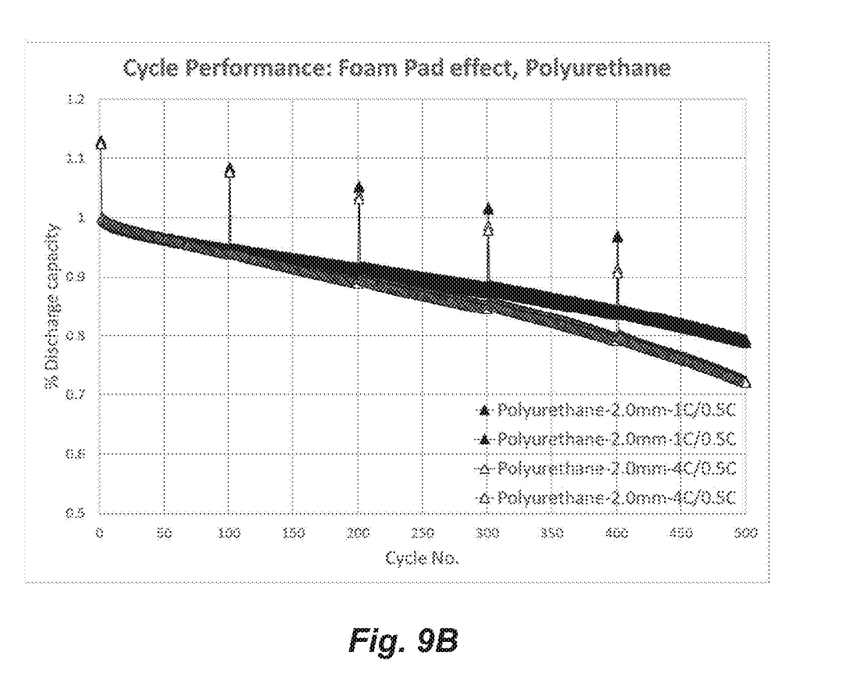
Figure 10A:
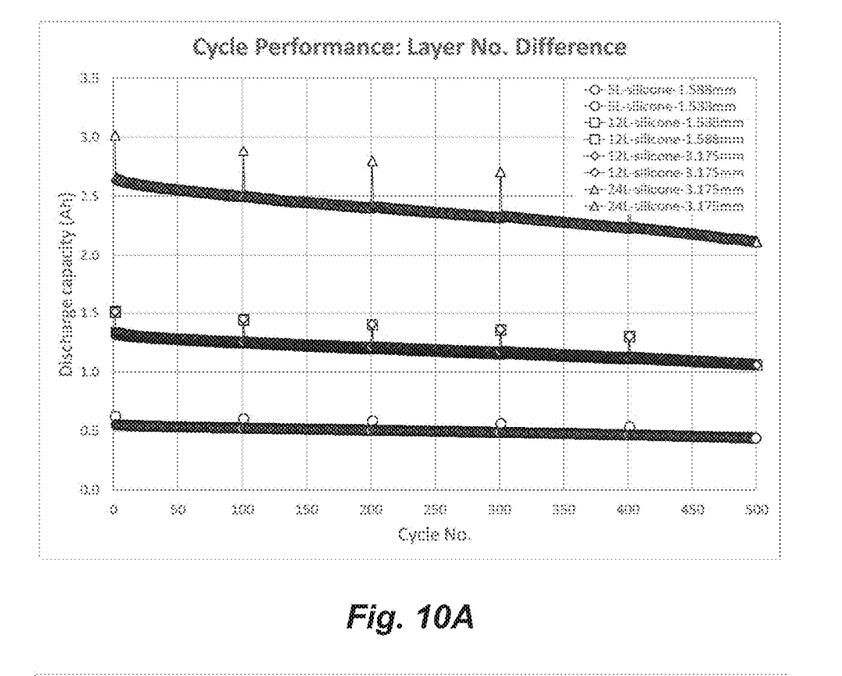
FIGS. 10A and 10B show the cycle performance of Si-dominant anode Li-ion batteries containing different numbers of cells in the cell stack while the spring layer remains the same.
Figure 10B:
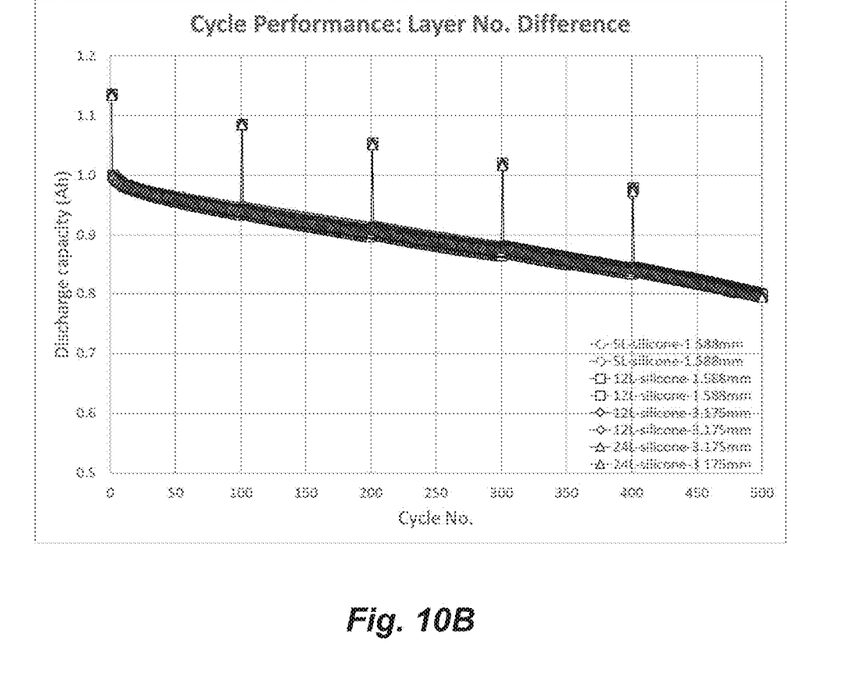

FIGS. 4 and 5 show the capacity degradation of the cells cycling at room temperature and at 45° C., respectively. The cells that were clamped at an initial pressure of above about 165 kPa show more significant capacity fade after about 50 cycles. FIG. 5 shows the capacity degradation of the cells cycling at about 45° C. The cells that were clamped at an initial pressure of below about 30 kPa show more significant capacity fade after about 50 cycles, with some showing a quick drop in discharge capacity after only a few cycles. The cycle performance test demonstrated the effect of initial pressure on the cell performance within the battery operation temperature range. It was concluded that the initial pressure set to between about 30 kPa and about 165 kPa are the preferred range.

Example 2

Cycle performance of lithium ion batteries with several different spring layers was tested. The discharge capacity of the batteries with different spring layer materials, thicknesses, number of layers of the spring layer material was measured from the beginning of life (i.e., after formation and degassing) to the end of life (i.e., 500 cycles). Some tests were with a higher 4 C charge rate. The capacity retention results are shown in FIGS. 5A-10B.

The results indicated that polyurethane, silicone, and neoprene-SBR as a spring layer work well. In addition, charging at 1 C (compared to 4 C) resulted in a better capacity retention.

Example 3

As seen from Table 1 below, for groups 1 and 2 cell expansion or swelling is dependent on initial applied pressure. Between group 2 and 9 we demonstrate effect of foam pad type (with different compression vs pressure response) on swelling. Comparing groups 4 vs. 5 and 9 vs. 10 the effect of initial cell thickness in cell expansion can be seen. Finally comparing groups 7 vs. 19 we demonstrate effect of charge rate on cell expansion. Similarly, effect of the foam pad material, charge rate, initial force and cell thickness on capacity retention can also be seen in the table below.

TABLE 1

| Group | Layer No. | Foam pad type | foam thickness | Initial force(kPa) | Charge rate | Initial cell | % expansion BOL-EOL | Cap. Retention after 500 cycles |
|---|---|---|---|---|---|---|---|---|
| Group 1 | 5 | neoprene-SBR | 1/16 inch | 200 | 1 C | 1.920111 | 9.42% | 78.96% |
| Group 2 | 5 | neoprene-SBR | 1/16 inch | 150 | 1 C | 1.951 | 4.38% | N/A |
| Group 3 | 12 | neoprene-SBR | 1/16 inch | 50 | 1 C | 4.053889 | N/A | 78.30% |
| Group 4 | 5 | neoprene-SBR | 1/8 inch | 150 | 1 C | 1.916278 | 11.61% | 73.12% |
| Group 5 | 12 | neoprene-SBR | 1/8 inch | 50 | 1 C | 4.060111 | 13.05% | 77.78% |
| Group 6 | 24 | neoprene-SBR | 1/8 inch | 50 | 1 C | 8.142222 | N/A | 77.72% |
| Group 7 | 12 | silicone | 1/8 inch | 50 | 1 C | 4.051111 | 11.35% | 79.77% |
| Group 8 | 24 | silicone | 1/8 inch | 50 | 1 C | 8.149111 | N/A | 79.70% |
| Group 9 | 5 | silicone | 1/16 inch | 150 | 1 C | 1.919111 | 7.94% | 79.47% |
| Group 10 | 12 | silicone | 1/16 inch | 50 | 1 C | 4.069278 | 10.61% | 80.07% |
| Group 11 | 5 | polyurethane | 2 mm | 150 | 1 C | 1.923778 | 7.17% | N/A |
| Group 12 | 12 | polyurethane | 2 mm | 50 | 1 C | 4.062889 | 6.76% | 80.23% |
| Group 13 | 5 | neoprene-SBR | 1.5875 inch | 200 | 4 C | 1.917111 | 11.02% | 74.95% |
| Group 14 | 5 | neoprene-SBR | 1.5875 inch | 150 | 4 C | 1.915056 | 15.54% | 68.83% |
| Group 15 | 12 | neoprene-SBR | 1.5875 inch | 50 | 4 C | 4.052167 | 20.94% | 72.65% |
| Group 16 | 5 | neoprene-SBR | 3.175 inch | 150 | 4 C | 1.922111 | 15.30% | 66.97% |
| Group 17 | 12 | neoprene-SBR | 3.175 inch | 50 | 4 C | 4.054889 | N/A | 70.31% |
| Group 18 | 24 | neoprene-SBR | 3.175 inch | 50 | 4 C | 8.140778 | N/A | 69.22% |
| Group 19 | 12 | silicone | 1/8 inch | 50 | 4 C | 4.061167 | 16.47% | 73.35% |
| Group 20 | 24 | silicone | 1/8 inch | 50 | 4 C | 8.114778 | N/A | 75.35% |
| Group 21 | 5 | silicone | 1/16 inch | 150 | 4 C | 1.9105 | 9.01% | 71.59% |
| Group 22 | 12 | silicone | 1/16 inch | 50 | 4 C | 4.050722 | 14.48% | 76.55% |
| Group 23 | 5 | polyurethane | 2 mm | 150 | 4 C | 1.911944 | 12.09% | 72.51% |
| Group 24 | 12 | polyurethane | 2 mm | 50 | 4 C | 4.0585 | 9.22% | 74.54% |
| Group 25 | 5 | 4 Paper | 1.44 mm | 200 | 4 C | 1.919 | 6.33% | 71.46% |
| Group 26 | 5 | 6 Paper | 2.16 mm | 200 | 4 C | 1.916167 | 6.56% | 71.41% |
| Group 27 | 5 | 8 Paper | 2.88 mm | 200 | 4 C | 1.923167 | 6.87% | 71.76% |

Example 4

The test conditions for high temperature cycling are summarized in Table 2 below.

TABLE 2

| Cycle No. | |
|---|---|
| | 2 C(4.2 V)/0.5 C(2.75 V) |
| 1 | Charge at 0.33 C to 4.2 V until 0.05 C, rest 5 minutes, discharge at 0.33 C to 2.75 V, rest 5 minutes |
| 2 | Charge at 2 C to 4.2 V until 0.05 C, rest 5 minutes, discharge at 0.5 C to 2.75 V, rest 5 minutes |
| 3-100 | Same as Cycle 2 |
| 101 | Same as Cycle 1 |
| 102-200 | Same as Cycle 2 |
| 201 | Same as Cycle 1 |
| 202-300 | Same as Cycle 2 |
| | 4 C(4.2 V)/0.5 C(3.1 V) |
| 1 | Charge at 0.33 C to 4.2 V until 0.05 C, rest 5 minutes, discharge at 0.33 C to 3 V, rest 5 minutes |
| 2 | Charge at 4 C to 4.2 V until 0.05 C, rest 5 minutes, discharge at 0.5 C to 3.1 V, rest 5 minutes |
| 3-100 | Same as Cycle 2 |
| 101 | Same as Cycle 1 |
| 102-200 | Same as Cycle 2 |
| 201 | Same as Cycle 1 |
| 202-300 | Same as Cycle 2 |

For high temperature cycling its important to select spring layer materials that demonstrate excellent compression set resistance. In this case silicone and certain grades of polyurethane, such as PORON®, show excellent recovery, spring-back behavior, to their original thickness after they are subjected to compression set resistance test.

Compression set test: The test measures how much a material does not rebound after compression in percentage. The foam thickness is measured prior to the test. Then the foam is compressed to between two clamps and stored at a high temperature, such as 45° C. or 60° C., for a length of time, such as 24 hours or 1 week. The foam is then unclamped and the foam thickness is measured again and compared to the original thickness. The compression set is calculated by dividing the thickness that did not rebound by the thickness that was deflected. The lower the percentage, the better the material resists permanent deformation under a given deflection and temperature range.

Figure 11:
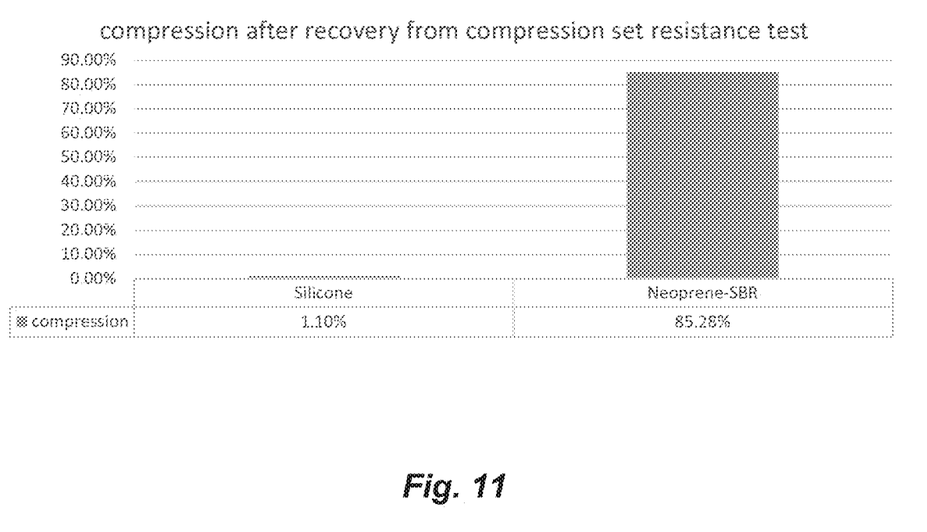
FIG. 11 shows the result of compression set test of two spring layer materials.

As shown in FIG. 11, Neoprene-SBR foam pad stayed compressed following the test, and the compression set was about 85%. On the other hand, the compression set for silicone was about 1.1%.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:
1. An energy storage device comprising:
a cell stack comprising a plurality of lithium-ion cells, wherein each lithium-ion cell comprises a Si-dominant anode;
a housing surrounding the cell stack;
a plurality of heat-sink layers positioned between and in contact with some of the plurality of lithium-ion cells;
a pressure regulation system comprising a plurality of spring layers positioned between and in contact with two of the plurality of lithium-ion cells, wherein contact surfaces of the plurality of spring layers and of the plurality of the heat-sink layers have a same area and are the same size as a contact surface of the plurality of lithium-ion cells; and
wherein the plurality of spring layers of the pressure regulation system in the housing exerts an initial pressure of between about 25 kPa and about 170 kPa on the cell stack corresponding to a first predefined range of states of charge, and a second pressure on the cell stack during cycling from compression of the plurality of spring layers caused by displacement of the plurality of spring layers from expansion of the plurality of lithium-ion cells at a second predefined range of states of charge.

2. The energy storage device of claim 1 wherein each of the plurality of the lithium-ion cells is a rectangular prism or cubical shape.

3. The energy storage device of claim 1 wherein the spring layer comprises silicone foam, low-density polyethylene (LDPE) foam, high-density polyethylene (HDPE) foam, crosslinked polyethylene (PE) foam, polypropylene (PP) foam, natural rubber foam, polyester foam, polyurethane foam, or latex foam.

4. The energy storage device of claim 1 wherein the pressure regulation system in combination with the housing exerts a pressure of no more than about 300 kPa and no less than about 30 kPa on the cell stack during the operational life of the energy storage device.

5. The energy storage device of claim 1, wherein the pressure regulation system comprises a plurality of spring layers, wherein one of the plurality of spring layers is positioned between the housing and one of the plurality of lithium-ion cells that is adjacent to the housing.

6. The energy storage device of claim 1, wherein the pressure regulation system comprises a plurality of spring layers, wherein one spring layer is positioned between each of the plurality of lithium-ion cells.

7. The energy storage device of claim 1, wherein the pressure regulation system comprises a plurality of spring layers and a plurality of heat-sink layers, wherein the plurality of spring layer are positioned between some of the plurality of lithium-ion cells and the plurality of heat sink layers are positioned between some of the plurality of lithium-ion cells.

8. The energy storage device of claim 1 wherein the plurality of spring layers comprise a polymeric material or an elastic material.

9. The energy storage device of claim 1 wherein the plurality of spring layers comprise a foam.

10. The energy storage device of claim 9 wherein the foam is selected from the group consisting of EPDM rubber foam, neoprene, SBR, silicone, polyurethanes, and PVC/NBR.

11. The energy storage device of claim 9 wherein the foam has a density from about 0.05 g/cc to about 1 g/cc.

12. The energy storage device of claim 9 wherein the foam has a thickness of from about 0.5 mm to about 3.5 mm.

13. The energy storage device of claim 9 wherein the foam is an EPDM rubber foam, silicone or polyurethane.

14. The energy storage device of claim 9 wherein the foam is a closed-cell foam.

15. The energy storage device of claim 1 wherein the plurality of spring layers comprise a non-porous pad.

16. The energy storage device of claim 15 wherein the non-porous pad has a density in the range of about 1.1 to about 2.3 g/cc.

17. The energy storage device of claim 1 wherein the lithium-ion cell has a cycle expansion of between about 3% and about 15%.

18. The energy storage device of claim 1 wherein the lithium-ion cell has a lifetime expansion of about 5% to about 30% measured at 100% state of charge.

19. A lithium ion battery pack comprising:
two or more energy storage devices of claim 1; and
an outer packing material surrounding the one or more energy storage devices.

20. A vehicle comprising:
the lithium ion battery pack of claim 19; and
electrical components electrically connected to the lithium ion battery pack.

21. The energy storage device of claim 9 wherein the Si-dominant anode comprises an active material with greater than 50% silicon.

22. The battery according to claim 1, wherein the predefined range of states of charge is between about 30-50%.

23. An energy storage device comprising:
a cell stack comprising a plurality of lithium-ion cells, wherein each lithium-ion cell comprises a Si-dominant anode;
a housing surrounding the cell stack;
a plurality of heat-sink layers positioned between and in contact with some of the plurality of lithium-ion cells; and
a pressure regulation system comprising a spring layer between two of the plurality of lithium-ion cells,
a plurality of spring layers positioned between and in contact with two of the plurality of lithium-ion cells, wherein contact surfaces of the plurality of spring layers and
of the plurality of the heat-sink layers have a similar area and are the same as a contact surface of the plurality of lithium-ion cells, wherein the heat-sink layer is collocated with the spring layer.

* * * * *